Dec. 5, 1939.    R. W. SMITH    2,181,981

TEMPERATURE RESPONSIVE RESISTOR

Filed Aug. 19, 1937

Inventor
Robert W. Smith

By Blackmore, Spencer & Flint
Attorneys

Patented Dec. 5, 1939

2,181,981

UNITED STATES PATENT OFFICE 2,181,981

TEMPERATURE RESPONSIVE RESISTOR

Robert W. Smith, Flint, Mich., assignor to General Motors Corporation, Detroit, Mich., a corporation of Delaware Application August 19, 1937, Serial No. 159,818

6 Claims. (Cl. 201—50)

This invention relates to gages used to record the temperature or the oil pressure of the internal combustion engine used on an automotive vehicle.

The gage is of the electrical type and is capable of making recordings at a distance from the object in regard to which a reading is desired, the instrument recording slight changes in electric current passing therethrough, the slight changes being produced by varying the pressure on one or more discs of titanium dioxide or boron carbide confined in the gage. These two substances have the characteristic of allowing the passage of a larger current with an increase in their contact pressure, and permitting a lesser current to pass therethrough when the contact pressure is decreased. By equipping the instrument with a material which has a relatively large thermal coefficient of expansion—such as aluminum or ebonite—and causing the change in length of this material to exert its pressure on the discs to change their contact pressure, a change in electrical current is produced. The change in contact pressure of the discs may also be accomplished by causing pressure to act directly thereon; for example, the pressure of the oil in the usual oil circulating system of an internal combustion engine may act directly on the discs to cause a change in current and thereby to register the amount of pressure in the oiling system. The changes in electric current passing through the discs are recorded by a differential galvanometer placed at a distance, such as at the instrument board of an automotive vehicle.

Figure 1:
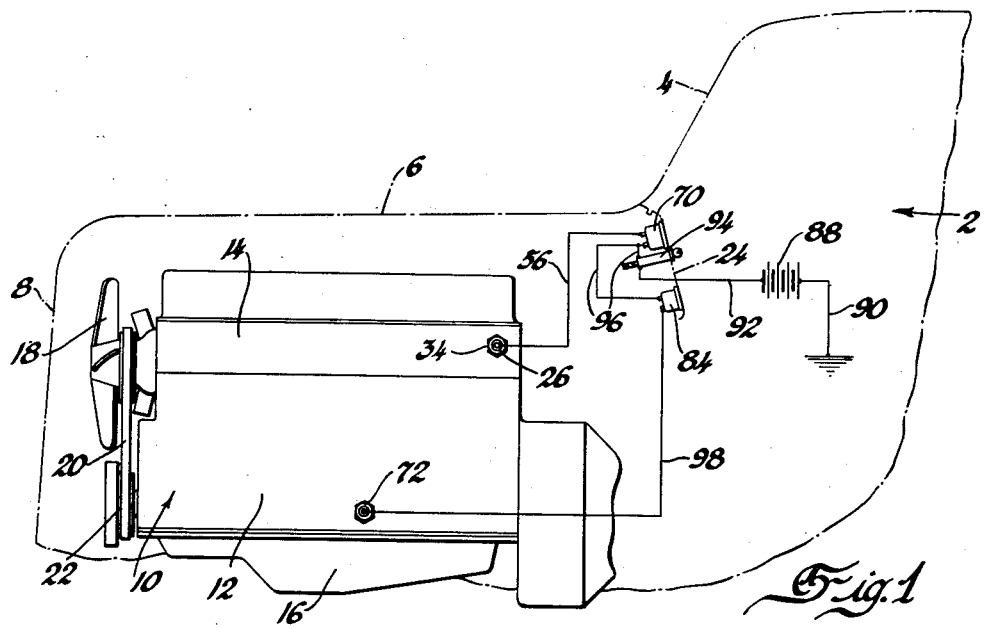
Figure 1 is an illustration of a part of an automotive vehicle, with the engine shown in full lines and illustrating the application of the invention as a heat recording instrument and as an oil pressure gage.

Referring to the drawing, the numeral 2 indicates an automotive vehicle as a whole. The vehicle has the usual windshield 4, hood 6 and grille 8. The internal combustion engine is indicated at 10, and includes the cylinder block 12, the cylinder head 14 and the oil pan 16. The usual fan is indicated at 18, driven from the fan belt 20, which in turn is driven from the grooved pulley 22. The instrument board of the vehicle is shown at 24.

The thermo responsive unit 26 of the invention is shown as applied to the engine cylinder head 14. This unit is shown in detail in Figure 2, and comprises the hollow brass or other suitable metallic shell or cartridge 28, screw-threaded as at 30 into the screw-threaded opening 32 in the cylinder head. The shell has an hexagonal head 34 for ease of application, and a recess 36 in the head is for the reception of an insulating washer 38. The head 34 has a passage 40 therethrough through which there passes the shank 42 of an end contact 44. The contact 44 has the head 46 inside the shell 28, and an insulating washer 48 spaces the head from the shoulder 50 in the shell 28. A metal washer 52 is received over the shank 42 and rests on the insulating washer 38. A nut 54 holds the washer 52 and contact 44 in place. A wire 56 is secured to the contact end by means of a second nut 58.

Inside the shell and adjacent the shoulder 50 and washer 48, an insulating cylinder 60 is applied. Inside the cylinder 60 and in contact with the head there is positioned the pressure sensitive disc 62, and in close contact with the disc 62 is a second similar disc 64, similarly insulated by the cylinder 60. These discs are preferably made of titanium dioxide or boron carbide, which substances have the characteristic of allowing more electricity to pass therethrough with an increase in contact pressure and allowing less electricity to pass therethrough when the contact pressure is decreased. Accordingly, the sensitivity of the gage will depend upon the amount of pressure exerted on the discs 62 and 64.

The end of the shell 28 is closed by the metal plug 66 which is screw-threaded thereinto, and closely confined between the plug 66 and the disc 64 is the piece or block 68 of a material which has a relatively high thermal coefficient of expansion, such as aluminum or ebonite. The heat from the water circulating system of the engine 10 will be transmitted from the shell 28 and plug 66 to the aluminum or ebonite 68 which will expand and compress the discs 62 and 64 and thereby increase their contact pressure and permit a larger current to pass therethrough. This increased current will pass along the wire 56 to the differential galvanometer 70 at the instrument board and record the amount of current. By suitably graduating the dial of the galvanometer to read in temperatures instead of current, the temperature of the engine may be read directly. For a suitable galvanometer of the type to be used see the patent to Elbridge F. Bacon, No. 1,791,786.

Figure 2:
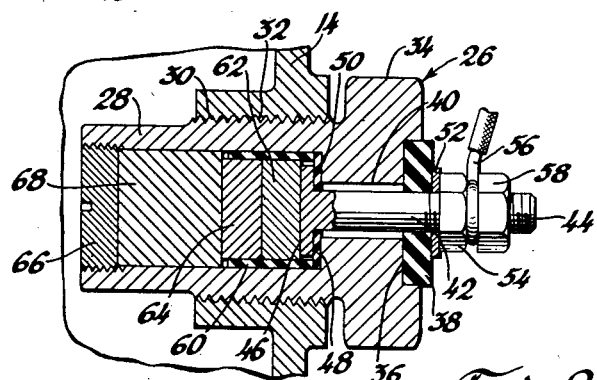
Figure 2 is a sectional detailed view on an enlarged scale through the heat responsive unit.
Figure 3:
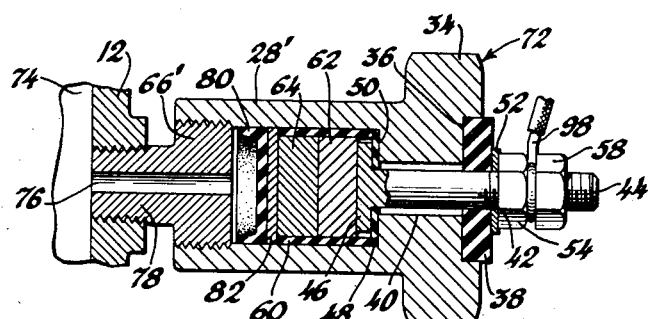
Figure 3 is a sectional detailed view on an enlarged scale through the oil pressure unit.

Referring to Figure 3, it will be seen that the invention is adaptable to receive pressures direct, such as the pressure of the oiling system of an internal combustion engine, and need not be confined to the expansion of a thermal substance such as that shown at 68 in Figure 2. The unit 72 is shown as applied to the engine block 12 and to have access to the oil passage 74 of the lubricating system. The shell is indicated at 28' and has many of the same parts shown in Figure 2, the similar parts being indicated by the same numeral. The plug 66' is different in that it has a bore 76 and an extension 78 which is screw-threaded into the engine block 10. Inside the shell there is the piston 80 in close contact with the shell, and between the piston and the disc 64 a metallic washer 82 is positioned. If desired this washer 82 may be eliminated. The oil passing from the oil passage 74 into the bore 76, exerts its pressure on the piston 80, which in turn exerts its pressure on the discs 62 and 64, either directly or through the intermediary of the disc 82. The pressure on the discs will increase their contact pressure and thereby allow a larger amount of electric current to pass therethrough. A decrease in oil pressure will relieve the contact pressure on the discs and thereby diminish the amount of current flowing therethrough. These changes in current will be recorded on the differential galvanometer 84 mounted at the instrument board 24.

The usual battery is indicated at 88, connected by a lead 90 to ground and by a lead 92 to the ignition switch 94. A lead 96 from the switch 94 goes to the two differential galvanometers 70 and 84, and from the galvanometer 70 the lead 56 goes to the heat sensitive unit 26, and from the galvanometer 84 a lead 98 goes to the oil pressure gage 72. From the units 26 and 72 the current returns through the engine block and ground to the battery 90.

I claim:

1. In an electrically responsive thermal gage, a unit adapted to be attached to a body the temperature of which is to be determined, an electrically conductive disc of titanium dioxide in the unit, said disc being capable of allowing a greater or less quantity of electricity to pass therethrough depending on its contact pressure, and a piece of aluminum confined in the gage and acting through thermal expansion and contraction directly on the disc to increase or decrease its contact pressure.

2. In an electrically responsive thermal gage, a metallic unit adapted to be attached to a body the temperature of which is to be determined, a closure for one end of the unit, a piece of aluminum in the unit next to the closure, a plurality of electrically conductive discs of titanium dioxide in the unit in contact with the aluminum, said discs being capable of allowing a greater or less quantity of electricity to pass therethrough depending on their contact pressure, and an electric contact at the other end of the unit confining the aluminum and discs, the expansion and contraction of said aluminum in response to heat changes causing an increase or decrease in the contact pressure on the discs to allow a greater or less amount of current to pass therethrough.

3. In an electrically responsive temperature gage, a unit adapted to be attached to a body in regard to which a temperature reading is to be obtained, a single titanium dioxide disc only in the unit, said disc being capable of conducting more or less electricity according to its contact pressure, means at one side of the disc to cause a change in the contact pressure on the disc, and an electric contact on the other side of the disc.

4. In an electrically responsive thermal gage, a unit adapted to be attached to a body the temperature of which is to be determined, two electrically conductive titanium dioxide discs only in the unit, said discs being capable of allowing a greater or less quantity of electricity to pass therethrough depending on their contact pressure, and a material having a large thermal coefficient of expansion, said material being confined in the unit and acting through thermal expansion and contraction directly on the discs to increase or decrease their contact pressure to vary the amount of current passing therethrough.

5. In an electrically responsive thermal gage, a unit adapted to be attached to a body the temperature of which is to be determined, two electrically conductive discs only of titanium dioxide in the unit, said discs being capable of allowing a greater or less quantity of electricity to pass therethrough depending on their contact pressure, and a piece of aluminum confined in the gage and acting through thermal expansion and contraction directly on the discs to increase or decrease their contact pressure.

6. In an electrically responsive temperature gage, a unit adapted to be attached to a body in regard to which a temperature reading is to be obtained, two titanium dioxide discs in the unit, said discs being capable of conducting more or less electricity according to their contact pressure, means at one side of the discs to cause a change in the contact pressure on the discs, and an electric contact on the other side of the discs.

ROBERT W. SMITH.